United States Patent
Li et al.

(10) Patent No.: US 8,537,496 B2
(45) Date of Patent: Sep. 17, 2013

(54) PERPENDICULAR MAGNETIC WRITE HEAD HAVING A TRAILING WRAP-AROUND MAGNETIC SHIELD MAGNETICALLY BIASED IN A CROSS TRACK DIRECTION

(75) Inventors: Zhihao Li, San Jose, CA (US); Xiaodong Che, Saratoga, CA (US); Zhen Jin, Fremont, CA (US); Yansheng Luo, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 334 days.

(21) Appl. No.: 12/844,736

(22) Filed: Jul. 27, 2010

(65) Prior Publication Data
US 2012/0026628 A1    Feb. 2, 2012

(51) Int. Cl.
*G11B 5/11* (2006.01)

(52) U.S. Cl.
USPC .................................. 360/125.3; 360/125.72

(58) Field of Classification Search
USPC .................. 360/125.3, 125.72, 128, 129, 319
See application file for complete search history.

(56) References Cited

U.S. PATENT DOCUMENTS

| | | | |
|---|---|---|---|
| 4,649,449 A | 3/1987 | Sawada et al. | 360/123 |
| 4,764,829 A | 8/1988 | Makino | 360/106 |
| 4,935,832 A | 6/1990 | Das et al. | 360/112 |
| 4,987,508 A | 1/1991 | Smith | 360/113 |
| 5,737,155 A | 4/1998 | George et al. | 360/113 |
| 5,883,763 A | 3/1999 | Yuan et al. | 360/113 |
| 6,925,033 B2 | 8/2005 | Van Kesteren et al. | 369/13.23 |
| 7,221,544 B2 | 5/2007 | Ohtsu et al. | 360/317 |
| 7,324,309 B1 | 1/2008 | Wiesen et al. | 360/319 |
| 7,477,481 B2 * | 1/2009 | Guthrie et al. | 360/119.03 |
| 7,483,246 B2 * | 1/2009 | Pinarbasi | 360/324.12 |
| 7,506,431 B2 | 3/2009 | Hsiao et al. | 29/603.16 |
| 7,751,148 B1 * | 7/2010 | Alstrin et al. | 360/241.1 |
| 2006/0039082 A1 * | 2/2006 | Biskeborn et al. | 360/129 |
| 2007/0115584 A1 | 5/2007 | Balamane et al. | 360/126 |
| 2008/0259498 A1 * | 10/2008 | Lengsfield et al. | 360/235.4 |
| 2008/0273268 A1 | 11/2008 | Hsiao et al. | 360/234.6 |
| 2009/0052074 A1 | 2/2009 | Nakagawa et al. | 360/39 |
| 2011/0116195 A1 * | 5/2011 | Cazacu et al. | 360/319 |

OTHER PUBLICATIONS

Prevention of Adjacent Track Interference on HDDs http://www.priorartdatabase.com/IPCOM/000142898/, Oct. 2009.
CPP-GMR reader and wraparound shield writer for perpendicular recording http://ieeexplore.ieee.org/xpl/freeabs_all.jsp?arnumber=1519160, Jul. 2010.
Newly developed wraparound-shielded head for perpendicular recording http://ieeexplore.ieee.org/xpl/freeabs_all.jsp?arnumber=1463717, Jul. 2010.

* cited by examiner

*Primary Examiner* — Jefferson Evans
(74) *Attorney, Agent, or Firm* — Zilka-Kotab, PC (57) ABSTRACT

A perpendicular magnetic write head having improved Bit Error Rate (BER), Adjacent Track Interference (ATI) and Far Track Interference (FTI). The write head includes a write pole and a trailing wrap-around magnetic shield. A permanent magnetic is located at either outer side of the shield. These magnets are magnetized to have magnetizations that are oriented in the same direction, in a direction that is perpendicular to the track direction and parallel with the air bearing surface.

8 Claims, 6 Drawing Sheets

PERPENDICULAR MAGNETIC WRITE HEAD HAVING A TRAILING WRAP-AROUND MAGNETIC SHIELD MAGNETICALLY BIASED IN A CROSS TRACK DIRECTION

FIELD OF THE INVENTION

The present invention relates to magnetic heads for data recording, and more particularly to a perpendicular magnetic write head that has a magnetic trailing wrap-around shield for improving bit error rate and reducing adjacent track interference and far track interference.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

A giant magnetoresistive (GMR) or tunnel junction magnetoresistive (TMR) sensor senses magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current there-through. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In a perpendicular magnetic recording system, the magnetic media has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

As perpendicular magnetic write heads become smaller, problems regarding adjacent track interference (ATI) and far track interference (FTI) appear. This has been found to be particularly problematic in certain regions within the trailing wrap-around magnetic shield where magnetic hot spots form. Therefore, there is a need for a perpendicular magnetic head design that can minimize such adjacent track interference and FTI, while maintaining excellent magnetic performance. These magnetic hot spots are usually "leaking" localized magnetic field during writing due to concentrations of magnetic domain structures. The leaking field can actually erase the magnetic media underneath, causing errors in these adjacent or far removed tracks.

SUMMARY OF THE INVENTION

The present invention provides a perpendicular magnetic write head having improved Bit Error Rate (BER), reduced Adjacent Track Interference (ATI) and Far Track Interference (FTI). The write head includes a write pole and a trailing shield or trailing wrap-around magnetic shield. A permanent magnetic is located at either outer side of the shield. These magnets are magnetized to have magnetizations that are oriented in the same direction, in a direction that is perpendicular to the track direction and parallel with the air bearing surface.

The permanent magnets create a cross-track field that reduces the formation of magnetic hot spots near the write pole, thereby preventing such hotspots from inadvertently erasing the media in adjacent or far away data tracks. The cross track magnetic field accomplishes this by generating magnetic domain formation that has less magnetic field leakage away from the write pole. This cross track field also advantageously increases field gradient, thereby improving the write head's ability to write to a magnetic media.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
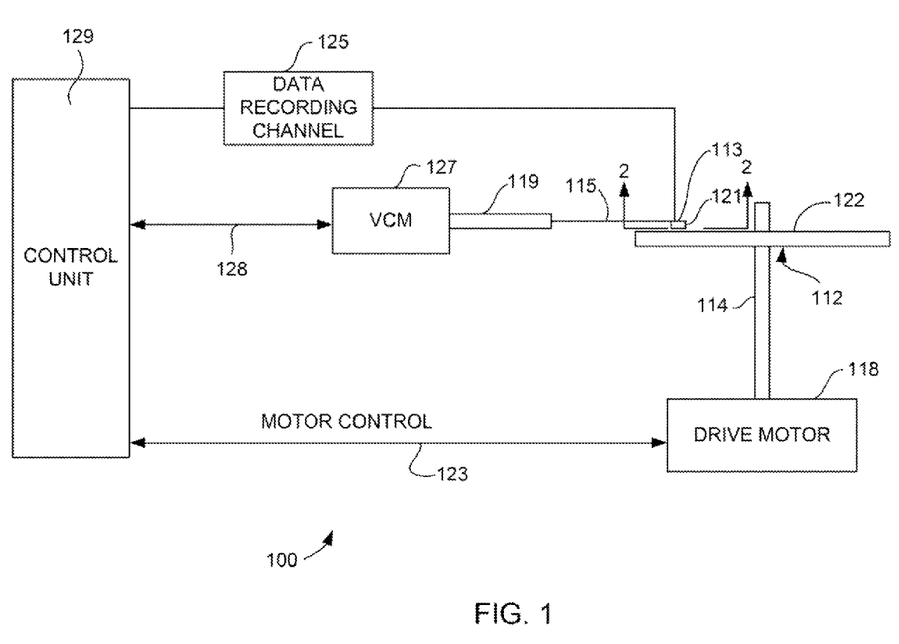
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
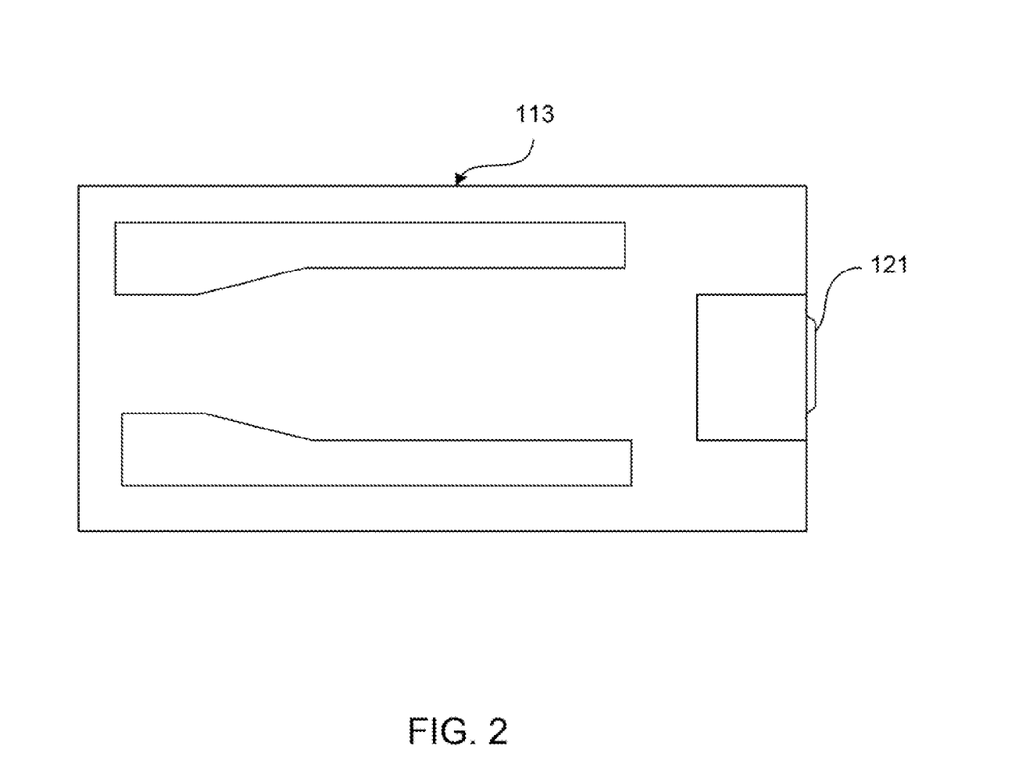
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
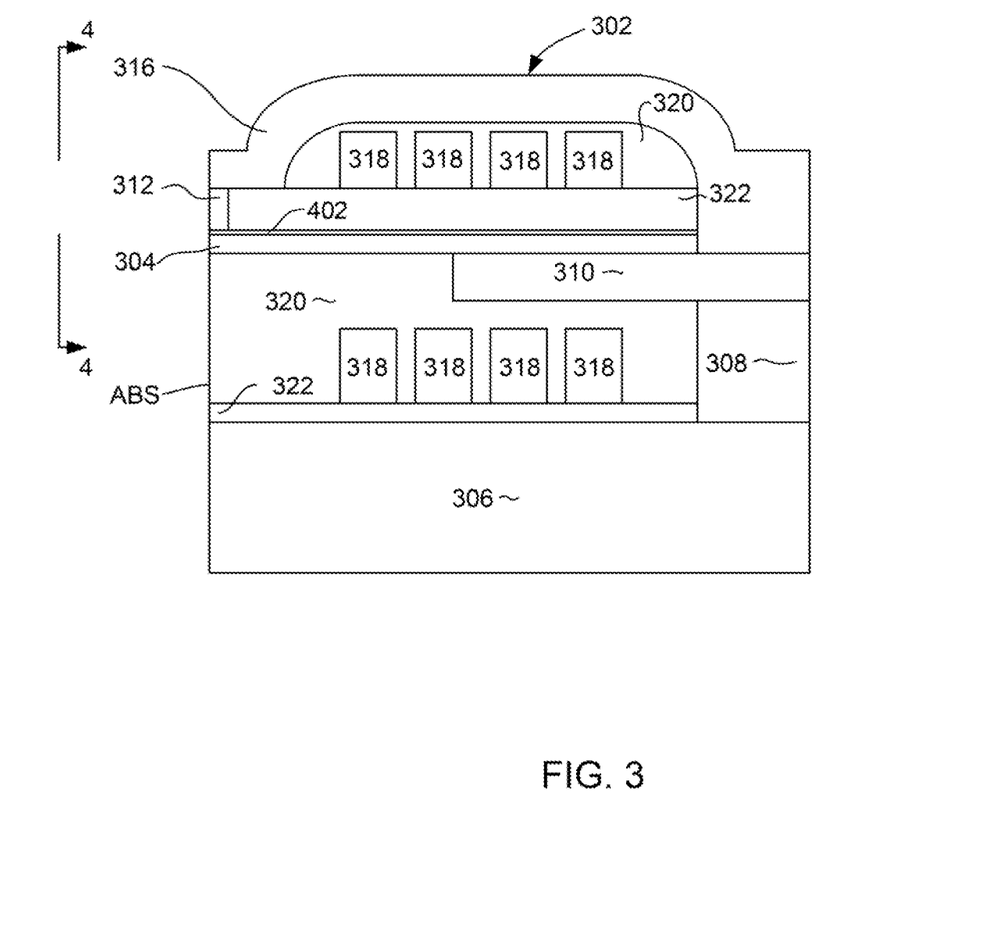
FIG. 3 is a cross sectional view of a magnetic write head according to an embodiment of the present invention.

FIG. 3 shows a magnetic write head 302 that includes a magnetic write pole 304 and a magnetic return pole 306. A magnetic back gap layer 308 and magnetic shaping layer 310 magnetically connect the return pole 306 with the write pole 304 at a location removed from an air bearing surface (ABS).

An electrically conductive, non-magnetic write coil 318 passes between the write pole 304 and return pole 306 and may also pass above the write pole 304. The write coil 318 can sit on top of a non-magnetic, electrically insulating material 322 and is also embedded in a non-magnetic, electrically insulating material 320 such as alumina and or hard baked photoresist.

During operation, an electrical current flowing through the coil 318 induces a magnetic field that results in a magnetic flux flowing through the write pole 304. This causes a magnetic field to be emitted from the write pole 304 toward a magnetic medium such as the magnetic medium 122 shown in FIG. 1. This magnetic write field flows through the medium to return to the return pole 306 which has a sufficiently large cross section that it does not erase the magnetic bit written by the write pole 304.

In order to increase the write field gradient (and thereby facilitate magnetic switching), the write head 302 also includes a magnetic trailing shield 312. This trailing shield 312 is separated from the write pole 304 by a non-magnetic trailing gap layer 402. The write pole 312 may also be connected with a trailing return pole 316 that connects the trailing shield 312 with the back portion of the write head 302, such as the back portion of the shaping layer 310.

Figure 4:
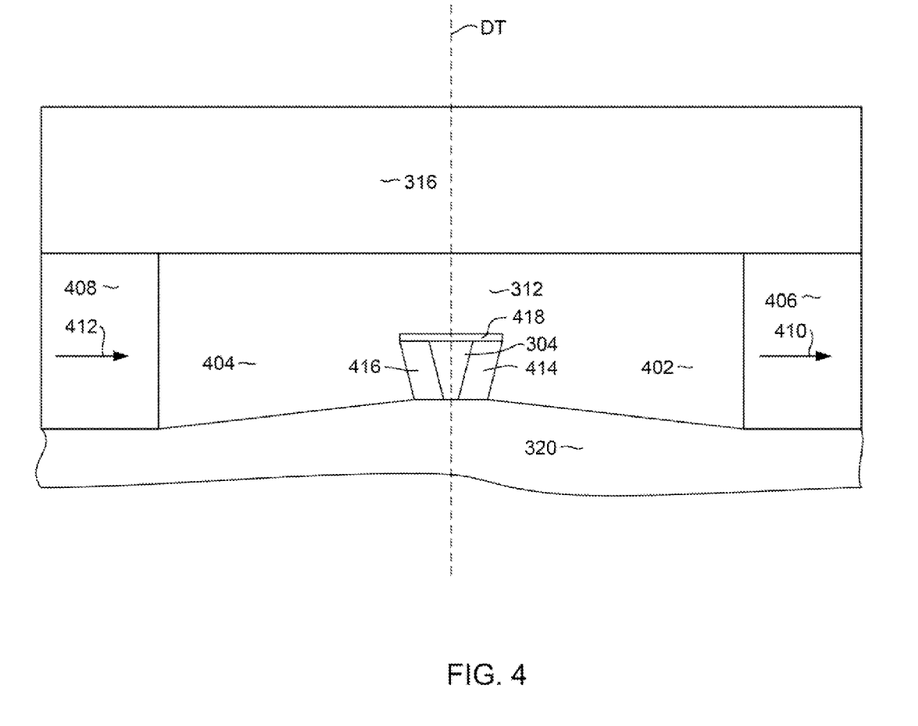
FIG. 4 is an ABS view of a portion of the magnetic write head of FIG. 3, as viewed from line 4-4 of FIG. 3.

FIG. 4 shows the pole tip region of the write head 302 as viewed from the ABS (as seen from line 4-4 of FIG. 3). As can be seen in FIG. 4, the write pole 304 has a tapered, trapezoidal shape wherein it is narrower at the leading edge and wider at the trailing edge. The trailing shield 312 has side portions 402, 404 that wrap-around the sides of the write pole and can, therefore, be referred to as a wrap-around trailing magnetic shield. The side portions 402, 404 of the shield 312 are separated from the write pole 304 by non-magnetic side gap layers 414, 416 and the trailing edge of the write pole 304 is separated from the shield 312 by a non-magnetic trailing gap layer 418. Although the shield 312 has been shown and described as a trailing wrap-around shield, the shield could also have little or no side shield portions and could, therefore, function as a primarily or purely trailing shield.

Also, as can be seen, the write head 302 includes first and second hard magnets 406, 408 located at first and second outer sides of the wrap-around trailing magnetic shield 312. These hard magnets 406, 408 are magnetized to have a magnetization (indicated by arrows 410, 412) that are oriented in the same direction perpendicular with data track direction (as indicated by line DT), and parallel with the air bearing surface ABS. Although the arrows are shown in FIG. 4 as pointing to the right, this is for illustration only, as the magnetization could be in either direction. The presence of the magnetized hard magnets prevent magnetic domain formation thereby improving the bit error rate (BER) of the write head, as well as preventing adjacent track interference (ATI) and far track interference (FTI).

Figure 5:
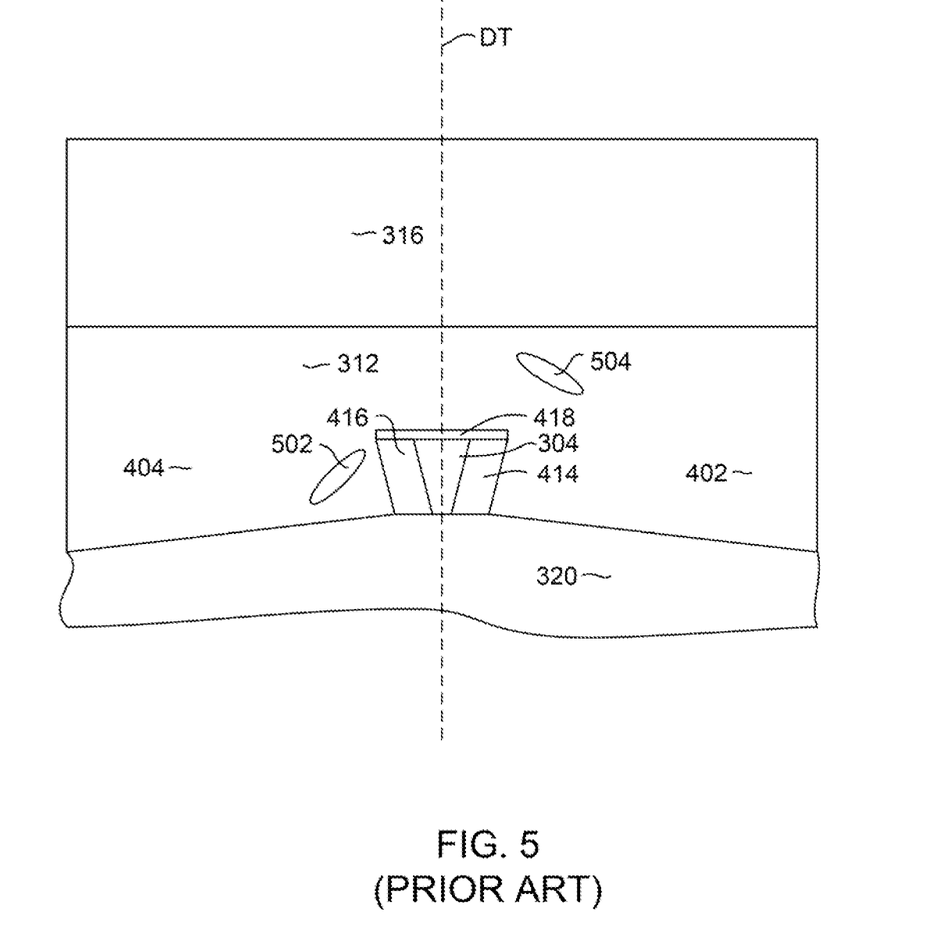
FIG. 5 is an ABS view of a prior art write head.
Figure 6:
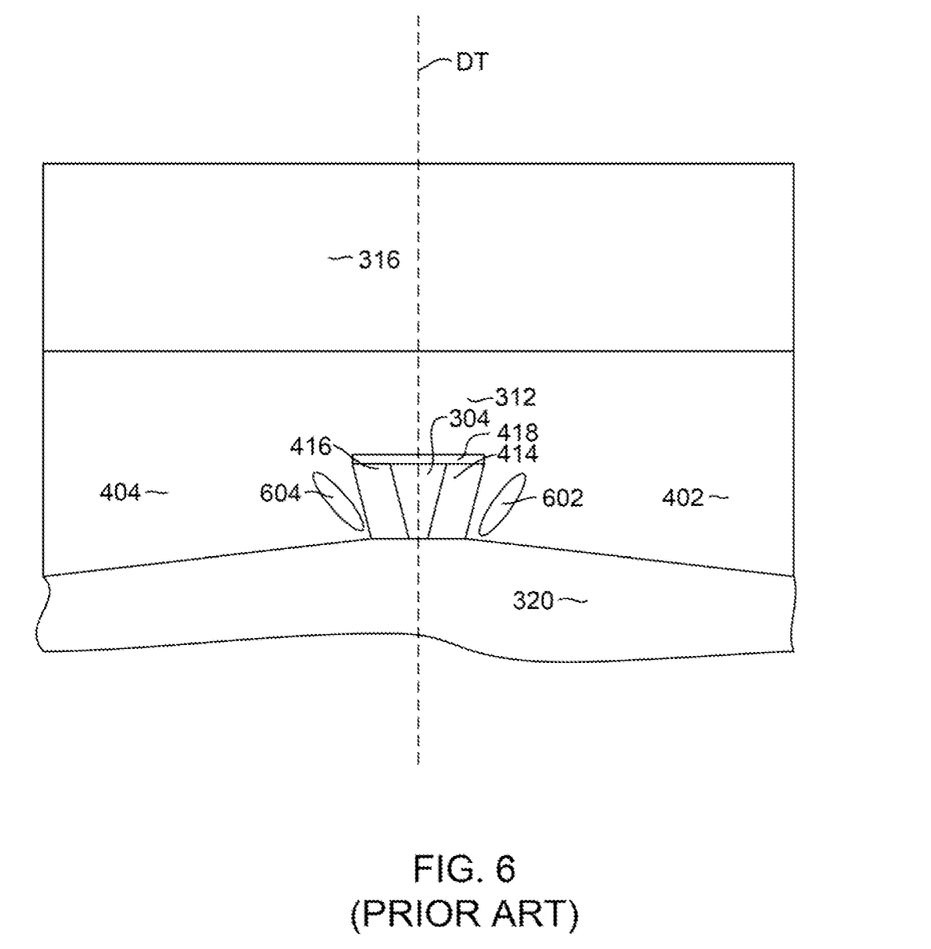
FIG. 6 is an ABS view of another prior art write head.

FIGS. 5 and 6 each show a view similar to that of FIG. 4 showing a prior art write head which does not have the hard magnets 406, 408 of the above described write head. In these prior art write heads, it has been found that certain magnetic hot spots 502, 504 (FIG. 5) and 602, 604 (FIG. 6) form in the trailing wrap around shield 312. These magnetic hot spots are show in FIG. 5 as being located in regions where these hot spots have been found to be particularly problematic. However, such hot spots could be located in other parts of the trailing shield as well. The location, strength and dimensions of these hot spots can also be affected by external magnetic fields. These hot spots 502, 504, 602, 604 tend to form around the area of the write pole 304, side gaps 414, 416 and trailing gap 418, where lines of magnetic flux become compressed when passing around the write pole 304 and gaps 414, 416, 418.

These hot spots arise from the formation of magnetic domains in the trailing shield. A problem presented by the presence of such magnetic hot spots is that the magnetic flux concentrations at the location of these hot spots 502, 504, 602, 604 can magnetize the magnetic media. While adjacent track interference in a single write pass may not be a problem, after several write passes on a data track of interest data tracks that are one or several data tracks away from the intended track may become damaged by the presence of these stray magnetic fields.

With reference again to FIG. 4, the presence of the magnets 406, 408 mitigate this hot spot problem by applying a magnetic field in a cross-track direction. The magnets can set the wrap around shield magnetization direction using a demagnetization field. In this case, no physical connection is required. Alternatively the magnets can set the wrap around shield magnetization direction using an exchange pinning field. In this case, the magnet needs to be connected with the shield. It is believed that the presence of this cross track magnetic field improves BER, ATI and FTI by moving the magnetic domains away from the region of the write pole 304 and gaps 414, 416, 418. Significant improvement in BER, ATI and FTI can be achieved with a magnetic field of only 70-80 Oe. To this end, the magnets 406, 408 are preferably constructed and annealed so as to produce a magnetic field of 50-100 Oe or 70-80 Oe at the location of the write pole 304. The magnets 406, 408 can be constructed of a high coercivity, hard magnetic material such as CoPt or CoPtCr, although this is by way of example as other magnetic materials could also be used.

Another benefit provided by the presence of the cross track magnetic field is that magnetic switching is made easier through an increase in field gradient. This effect is similar to the field gradient increase provided by the trailing portion of the shield 312 across the trailing gap 418.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A perpendicular magnetic write head, comprising:
a magnetic write pole having an end extending to an air bearing surface and having a trailing edge and first and second laterally opposed sides;
a trailing magnetic shield separated from the trailing edge of the write pole by a non-magnetic trailing gap, the trailing shield having first and second outer sides; and
first and second magnets formed at each of the first and second outer sides of the trailing magnetic shield;
wherein the first and second magnets are magnetized to produce a magnetic field of 50 to 100 Oe at the location of the magnetic write pole.

2. A perpendicular magnetic write head, comprising:
a magnetic write pole having an end extending to an air bearing surface and having a trailing edge and first and second laterally opposed sides;
a trailing magnetic shield separated from the trailing edge of the write pole by a non-magnetic trailing gap, the trailing shield having first and second outer sides; and
first and second magnets formed at each of the first and second outer sides of the trailing magnetic shield;
wherein the first and second magnets are magnetized to produce a magnetic field of 70-80 Oe at the location of the magnetic write pole.

3. A perpendicular magnetic write head, comprising:
a magnetic write pole having an end extending to an air bearing surface and having a trailing edge and first and second laterally opposed sides;
a trailing magnetic shield separated from the trailing edge of the write pole by a non-magnetic trailing gap, the trailing shield having first and second outer sides; and
first and second magnets formed at each of the first and second outer sides of the trailing magnetic shield;
wherein the first and second magnets are connected with the first and second sides of the trailing shield.

4. A perpendicular magnetic write head, comprising:
a magnetic write pole having an end extending to an air bearing surface and having a trailing edge and first and second laterally opposed sides;
a wrap-around trailing magnetic shield separated from the trailing edge of the write pole by a non-magnetic trailing gap and separated from the first and second sides of the write pole by first and second non-magnetic side gaps, the trailing shield having first and second outer sides; and
first and second magnets formed at each of the first and second outer sides of the trailing magnetic shield;
wherein the first and second magnets are magnetized to produce a magnetic field of 50 to 100 Oe at the location of the magnetic write pole.

5. A perpendicular magnetic write head, comprising:
a magnetic write pole having an end extending to an air bearing surface and having a trailing edge and first and second laterally opposed sides;
a wrap-around trailing magnetic shield separated from the trailing edge of the write pole by a non-magnetic trailing gap and separated from the first and second sides of the write pole by first and second non-magnetic side gaps, the trailing shield having first and second outer sides; and
first and second magnets formed at each of the first and second outer sides of the trailing magnetic shield;
wherein the first and second magnets are magnetized to produce a magnetic field of 70-80 Oe at the location of the magnetic write pole.

6. A perpendicular magnetic write head, comprising:
a magnetic write pole having an end extending to an air bearing surface and having a trailing edge and first and second laterally opposed sides;
a wrap-around trailing magnetic shield separated from the trailing edge of the write pole by a non-magnetic trailing gap and separated from the first and second sides of the write pole by first and second non-magnetic side gaps, the trailing shield having first and second outer sides; and
first and second magnets formed at each of the first and second outer sides of the trailing magnetic shield;
wherein the first and second magnets are connected with the first and second sides of the trailing shield.

7. A magnetic disk drive, comprising:
a housing;
a magnetic media, rotatably mounted within the housing;
a suspension assembly pivotally mounted within the housing;
a slider mounted on the suspension assembly for movement adjacent to a surface of the magnetic media; and
a magnetic write head, the magnetic write head further comprising:

a magnetic write pole having an end extending to an air bearing surface and having a trailing edge and first and second laterally opposed sides;

a trailing magnetic shield separated from the trailing edge of the write pole by a non-magnetic trailing gap, the trailing shield having first and second outer sides; and first and second magnets formed at each of the first and second outer sides of the trailing magnetic shield.

8. A magnetic disk drive, comprising:

a housing;

a magnetic media, rotatably mounted within the housing;

a suspension assembly pivotally mounted within the housing;

a slider mounted on the suspension assembly for movement adjacent to a surface of the magnetic media; and a magnetic write head, the magnetic write head further comprising:

a magnetic write pole having an end extending to an air bearing surface and having a trailing edge and first and second laterally opposed sides;

a wrap-around trailing magnetic shield separated from the trailing edge of the write pole by a non-magnetic trailing gap and separated from the first and second sides of the write pole by first and second non-magnetic side gaps, the trailing shield having first and second outer sides; and first and second magnets formed at each of the first and second outer sides of the trailing magnetic shield.

\* \* \* \* \*